United States Patent Office 3,182,055
Patented May 4, 1965

3,182,055
REGENERATION OF e-CAPROLACTAM FROM POLYAMIDES
John H. Bonfield, East Aurora, N.Y., and Richard C. Heckey and Orvill E. Snider, Petersburg, and Basil G. Apostle, Richmond, Va., assignors to Allied Chemical Corporation, New York, N.Y., a corporation of New York
No Drawing. Filed Feb. 18, 1963, Ser. No. 259,346
5 Claims. (Cl. 260—239.3)

This invention relates to the recovery of epsilon-caprolactam from caprolactam-derived polyamides, and more particularly to an improved continuous recovery process of high efficiency and reduced corrosive effect on equipment.

Synthetic linear polyamides derived from epsilon-caprolactam, generally known as nylon 6 polymers, are used in the manufacture of fibers, films, molded articles and other useful products. The manufacture of polymer products frequently involves the accumulation of considerable amounts of waste polymer material. In view of the cost of manufacture of these polyamide type polymers, the economic recovery of the monomeric intermediate, e-caprolactam, in a form capable of undergoing re-polymerization is of great importance.

The recovery of epsilon-caprolactam from its polymers is generally effected by an operation referred to as de-polymerization. Various specific depolymerization processes have been proposed, the most significant being processes involving the combined action of steam and phosphoric acid on molten polymer whereby e-caprolactam is obtained in admixture with water as an effluent condensate. The phosphoric acid ($H_3PO_4$) is considered to function as a catalyst for the depolymerization, but has generally been required in large amounts, likely to accentuate corrosion, and has led to low efficiencies of e-caprolactam recovery, non-uniform recovery rates, and low concentrations of monomer in the aqueous condensate product. Continuous operation of depolymerization systems has thus been unsuccessful due to the large amounts of residual, non-depolymerizable material which accumulates, and the non-uniform reaction rates. In view of the eutectic-forming nature of e-caprolactam-water mixtures, it is generally more expensive commercially to recover e-caprolactam from aqueous condensates of less than 35% concentration by crystallization, distillation, or other methods.

It is an object of the present invention to provide a continuous process for the efficient recovery of e-caprolactam from ε-caprolactam-derived polyamides.

It is another object of this invention to provide a continuous process for the efficient recovery of e-caprolactam in concentrated form from nylon 6 polymer under conditions which minimize corrosive damage to metal equipment employed in the process.

It is still another object of this invention to provide a continuous process for the efficient recovery of e-caprolactam from e-caprolactam-derived linear polyamides as a concentrated aqueous solution from which e-caprolactam can be efficiently recovered in a form suitable for re-polymerization to form polyamides.

Other objects and means for their accomplishment will become apparent hereinafter.

We have now found that phosphoric acid when introduced in rather low proportions with caprolactam polymer into a depolymerization zone, rapidly loses catalytic activity during the depolymerization process. Introducing larger proportions of the phosphoric acid will serve to maintain the catalytic action, but leads to the formation of nonrecoverable residues, to lactam production in only low concentration, and to possible corrosive damage to the metal of the reaction vessel. We have surprisingly found that by progressively, e.g. continuously, introducing phosphoric acid and polymer in proportions maintained below a critical maximum of acid:polymer into the depolymerization zone, and adding fresh phosphoric acid and polymer in like proportions at a regulated uniform rate to the system, and maintaining critical ranges of other process parameters, a highly efficient continuous process is achieved.

Accordingly the objects of this invention are accomplished in general by a process comprising introducing polymer of e-caprolactam and at least about 0.1 part but not over 5 parts of orthophosphoric acid, calculated on 100%, per 100 parts by weight of said polymer substantially continuously at substantially uniform rates into a depolymerization zone containing a pool of polymer from which monomer is being formed. In our process we adjust the feed rate in relation to temperature, pressure, and steam flow rate to maintain the pool at substantially constant volume which we find to be important for continuous operation with consistently high efficiency. We maintain the polymer pool at approximately constant temperature between about 220° C. and about 375° C. and at absolute pressure between about ½ and about 6 atmospheres and we pass steam through said pool at a rate to provide an evolved vapor mixture containing between about 35% and about 80% caprolactam by weight. We condense evolved vapors to recover e-caprolactam monomer.

The polymer of e-caprolactam is preferably introduced into the depolymerization zone in solution form containing the requisite amount of phosphoric acid, and additionally, water and e-caprolactam monomer which acts as a solvent and moderating agent. The fluid mixture may be prepared by mixing e-caprolactam-derived polymer with orthophosphoric acid, water and e-caprolactam, and heating the mixture at a temperature in the range of about 160° C. and 250° C. for about one to four hours under autogenous pressure of about 5–14 atmospheres. The heating of the mixture may be accomplished by contact with high pressure steam, radiant heating, indirect heat exchange, or other methods. The presence of the phosphoric acid during the formation of a fluid solution of the polymer has been found to afford the unexpected advantage of lowering the viscosity of the solution. Once formed, the solution of the e-caprolactam-derived polymer is preferably added as a continuous stream to the depolymerization zone at a volumetric rate adjusted to approximate the volumetric rate of removal of monomer and water, thereby maintaining substantially constant volume in the depolymerization zone.

The depolymerization process of this invention may be carried out in equipment such as kettles provided with fluid inlet and outlet means, means for agitation of the fluid contents of the vessel, steam inlet means, means for the removal of overhead vapors, heating means, and means for improving gas-liquid interfacial contact. It is preferable to employ heating means which, by radiation or thermal conduction, supply at least 40% of the heat to the depolymerization zone, the remainder of the heat in said zone being supplied by the steam throughout. Ordinarily materials of construction may be employed in view of the relatively non-corrosive nature of the operation. Detection and control devices may be suitably employed to maintain desired temperatures, agitation rates, and steam flow rates.

The temperature of the polymer pool in our process should be in the range between about 220° C. and about 375° C. and should be held approximately constant to obtain consistently efficient operation. The pool itself can be formed by accumulating our reaction mixture, e.g. by feeding our phosphoric acid/polymer mixture to a reaction zone maintained under our conditions except that the steam rate is low; or the pool can be formed under conditions outside those used for the main period of our process, e.g. using larger amounts of phosphoric acid than specified for our process, etc.

The phosphoric acid, although preferably added to the depolymerization zone in admixture with fluidized polymer, may however be added separately to the depolymerization zone. The phosphoric acid may be added in requisite amounts continuously to the depolymerization zone, or may be added in discrete batchwise additions of uniform regularity. It is essential however that the phosphoric acid be incrementally added to the depolymerization zone during its continued operation in amounts averaging between about 0.1 and 5 parts per 100 parts by weight of introduced polymer. Preferably the phosphoric acid is added in proportions averaging between about 0.1 and 1 part per 100 parts of polymer and not exceeding at any time during the continuous operation 3 parts per 100 parts of polymer.

Chemical analysis of the depolymerizing mixture indicates that under our conditions the orthophosphoric acid is converted at a substantially steady rate to complex phosphorus-organic derivatives which are ineffective as catalyst and represent a loss of recoverable monomer. If larger amounts of phosphoric acid than about 5 parts per 100 parts of polymer are introduced in the depolymerization mixture, the formation of phosphorus-organic derivatives is greatly accelerated, resulting in losses of phosphoric acid and lactam, and formation of tars imparting excessively high viscosities which inhibit further continuous operation. By the incremental addition of phosphoric acid and the critical selection of other parameters as provided by the process of this invention, conversion efficiencies better than 90% are obtained in continuous operations; that is, more than 90% of the theoretically recoverable lactam is obtained based on the amount of e-caprolactam-derived polymer introduced into the depolymerization zone. By a continuous operation is meant the passage through said depolymerization zone of a volume of material at least 5 times greater than the volume of said zone, under substantially uniform conditions of operation.

The steam employed in the depolymerization process of this invention may be either of the saturated or superheated variety. The steam is generally introduced into the bottom of the depolymerization zone through a sparger or analogous device which facilitates efficient contact of the steam with the depolymerizing mixture, and provides agitation of the mixture. Although the steam delivers some heat to the depolymerization zone, its principal function is to carry the produced lactam out of the depolymerization zone to a condenser and recovery zone. In accomplishing these objectives most effectively, the rate of steam employed is preferably between 0.25 to 1.5 pounds of steam per pound of polymer feed.

In the course of the depolymerization reaction process of this invention, a complex series of physical and chemical occurrences prevail, some of which may be approximately represented by the following equations:

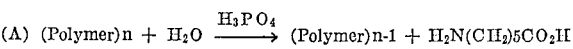
(A) (Polymer)n + H₂O  —H₃PO₄→  (Polymer)n-1 + H₂N(CH₂)₅CO₂H

(B) H₂N(CH₂)₅CO₂H  ⟶  O=C—| HN—(CH₂)₅ + H₂O

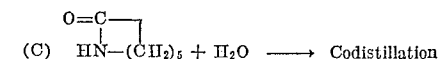
(C) O=C—| HN—(CH₂)₅ + H₂O  ⟶  Codistillation

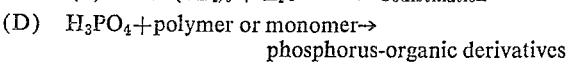
(D)  H₃PO₄ + polymer or monomer →
  phosphorus-organic derivatives

Reaction A is dependent upon temperature, phosphoric acid concentration, water concentration, and amino acid concentration. Reaction B is dependent upon temperature and concentrations of water, amino acid, and lactam. Occurrence C is dependent upon temperature, pressure, steam flow rate, viscosity of the mixture, and concentrations of water and lactam. Reaction D depends primarily upon the concentration of free orthophosphoric acid. Since the overall process is operated continuously at non-equilibrium conditions, the yield of lactam in the overhead condensate is affected to a greater extent by the rates of the various occurrences rather than equilibrium considerations. It is thus seen that the limitations which define the surprisingly efficient process of this invention delineate unobvious critical conditions for the successful accomplishment of the desired objectives.

In view of the relatively insignificant corrosivity of the depolymerizing mixture in contradistinction to prior art methods, it is not essential that glass-lined, or polymer-lined vessels be employed, nor is it essential to incorporate corrosion inhibiting substances in the deploymerizing mixture. However, in the case of systems consisting of unlined ferrous vessels and auxiliary equipment, it may be desirable to incorporate corrosion inhibiting substances in the deploymerization mixture to prevent damage due to accidental spillage of the concentrated phosphoric acid used in the process, or accidentally high concentrations of phosphoric acid in the deploymerization zone. Heavy metal ions selected from the group consisting of copper, manganese and tin may be included in the deploymerizing mixture in amounts ranging from 20 parts per million to about 5%, and do not interfere with the depolymerization process.

By regulation of the proportional steam input and polymer quantities, the effluent vapor from the depolymerizing zone is made to contain between 35% and 80% e-caprolactam. Effluent concentrations of e-caprolactam below 35% create recovery problems; and, under conditions which provide concentrations above 80%, it is found that the rate of depolymerization becomes unfeasibly slow. Upon condensation of the effluent vapors, a homogenous solution forms, from which the lactam is easily recoverable. For example, the water may be removed by conventional evaporation at normal or reduced pressures, by flash evaporation processes, membrane diffusion processes, azeotropic distillations, countercurrent treatment with anhydrous inert gases, treatment with hydratable inorganic salts or active zeolytes such as "molecular sieves," non-contacting exposure to water-reactive compounds such as P₂O₅, and other methods. It is generally not required that the caprolactam be recovered in completely anhydrous condition, since the reconversion of the caprolactam into useful polymer can generally be effected in the presence of water, e.g. as taught in United States Patent 2,241,321 of May 6, 1941, to Schlack. The caprolactam obtained by the process of this invention, after recovery from the aqueous condensate, will generally have a permanganate number below about 20, determined from optical density resulting upon action of permanganate by standard test outlined e.g. in United States Patent 3,021,326 of Feb. 13, 1962, to Snider et al.; and an APHA color below about No. 20 (Pt–Co standard, 100% basis), characteristics of good quality monomer suitable for repolymerization without further purification. (See Joris U.S.P. 2,813,858 of November 13, 1957, column 1, lines 36–55.)

Our process forms a small amount of non-volatile residue. Residual, non-depolymerizable material may be periodically removed from the depolymerization vessel; or a small quantity of liquid can be periodically or continuously withdrawn from the vessel as a bleed for purposes of maintaining the tar accumulation below a selected maximum level.

Caprolactam polymers from which e-caprolactam monomer can be efficiently recovered by the process of this invention include polymer compositions consisting entirely of poly-e-caprolactam homopolymer; copolymers of e-caprolactam with higher lactams; polymers containing e-caprolactam, diamines and diacids; and other mixed polymer types. Linear caprolactam polymers of any molecular weight are found satisfactorily amenable to the process of this invention, including oligomers consisting of only several monomeric units. The polymer composition may contain conventional additives such as fillers, pigments, flame retardants, anti-static agents, mold release agents, plasticizers, and other ingredients. It is preferred however that little if any volatile components be present.

The pressure within the depolymerization vessel may be controlled by the pressure of the inlet gas in conjunction with constrictive gas outlet means; by temperature elevation of relatively confined gas within the depolymerization zone; by mechanical compressing means communicating with said vessel; or by other pressure controlling means. Pressures below ½ atmosphere, representing a partial vacuum, are found inoperative in view of the inadequate concentrations of water afforded to the depolymerizing mixture. Pressures above 6 atmospheres generally provide diminished rates of lactam recovery, possibly due to adverse effects caused on the concentration and interphase relationships of the vapor mixture effluent of water and lactam.

The following example describes completely a specific embodiment of our invention illustrative of the best mode contemplated by us of carrying out our invention; but is not intended to be considered as limitative of the scope of the invention. All parts and percentages are by weight unless otherwise specified.

EXAMPLE

Into each of 2 separate vessels in turn was charged 1,000 pounds of polycaproamide scrap in the form of ground-up solid waste, 2.25 pounds of aqueous 85% orthophosphoric acid, and 1,000 pounds of aqueous 50% e-caprolactam solution. The vessels, thus charged, were sealed shut. Heated fluid at 175°–180° C. was passed through the external heating jacket. At the same time, high pressure steam at 175°–180° C. and about 125–130 p.s.i.g. was injected into the mixture in the vessel. The steam injection was discontinued when the batch temperature reached about 175° C. The contents of the vessel were held at about 175° C. under autogenous pressure of 125–135 p.s.i.g. for ½ hour without agitation. While the dissolved polymer mixture thus prepared was being fed from one dissolving vessel to a depolymerization vessel, additional solution was being prepared in the second dissolving vessel.

The ploymer solution was continuously fed at a substantially uniform rate of 1,300 pounds per hour into a depolymerization vessel of 8,000 U.S. gallons capacity equipped with an external heating jacket, internal heating coils, and steam sparger, made of stainless steel. A pool of approximately 2,000 U.S. gallons of depolymerizing mixture was allowed to accumulate and was thereafter maintained in the kettle. The pool temperature was maintained at 275° C. Superheated steam at 350° C. and 100 p.s.i.g. entered the bottom of the pool through a sparger at the rate of 700 pounds per hour. At least about 40% of the heat supplied to the pool was supplied via the heating jacket and coils, the remaining being supplied by the steam. The pressure above the pool of depolymerizing mixture was about 3 to 6 p.s.i.g.

Vapors consisting of water and e-caprolactam were continuously evolved from the depolymerization vessel at a substantially uniform rate of about 2,000 pounds of vapors per hour having an average lactam content of about 45–50% by weight.

The above described conditions of operation were maintained during a continuous throughput of 100,000 pounds of the polycaproamide scrap.

For purposes of determining residue, the depolymerizing pool was then allowed to run dry by cutting off the feed stream of dissolved polymer mixture while continuing the steam flow. The residual product thus obtained, which afforded no further lactam upon continued application of steam, weighed about 2,000 pounds. The overall efficiency of recovery of monomer from the polycaproamide feed stock was thus about 98%.

The residual product consisted of a complex mixture of high-melting cross-linked polymer and phosphorus-organic compounds. The residual product, although having a phosphorus content corresponding to about 7.5% by weight as orthophosphoric acid, contained less than 5% by weight of free orthophosphoric acid. This residue, although representing a loss insofar as recovery of e-caprolactam monomer is concerned, can be converted into useful shaped solid or foamed objects which are flameproof in view of the high phosphorus content of the material. Corrosive damage to the metal parts contacted by the depolymerizing mixture was negligible, as determined by 6 months continuous equipment operation.

Batchwise test runs

In order to determine the effect of the proportion of orthophosphoric acid introduced on the depolymerization process of this invention, a series of test runs was performed under varying conditions of operation using batchwise charges of known composition in the depolymerization vessel.

The data showing conditions and results are presented in Table I. "Recovered Lactam Concentration" expresses concentration of lactam (weight percent) in the condensed vapors; and "$H_3PO_4$ (%)" expresses weight percent of commercial aqueous 85% phosphoric acid in the batch of acid and polycaproamide introduced into the reaction vessel. Runs, A, B, and C are tests of conditions within the range used in our process, whereas runs D, E, F, and G employ certain conditions outside the ranges used in our process.

TABLE I

| Process variable | A | B | C | D | E | F | G |
|---|---|---|---|---|---|---|---|
| Recovered lactam concentration, percent | 55 | 55 | 55 | 37 | 10 | 85 | 39 |
| Steam rate (grams/hour) | 300 | 360 | 720 | 500 | 720 | 100 | 300 |
| Temperature of the stream (° C.) | 400 | 400 | 400 | 400 | 300 | 400 | 280 |
| Polymer pool temperature (° C.) | 360 | 340 | 320 | 300 | 300 | 370 | 210 |
| $H_3PO_4$ (percent) | 1.8 | 2.4 | 3.0 | 7.0 | 16.7 | 2.3 | 3.3 |
| Lactam production rate (grams/hour) | 367 | 440 | 880 | 300 | 80 | 230 | 180 |
| Heavy metal (p.p.m.): | | | | | | | |
| Cu | 10 | | 70 | | 40 | | |
| Mn | 20 | 20 | 50 | 70 | | 30 | 60 |
| Sn | | 10 | | | | | |
| Overall efficiency (percent) | 98 | 94 | 93 | 95 | 75 | 89 | 95 |

As the data of runs D, E, F and G of Table I indicate, conditions of temperature, recovered lactam concentration, or $H_3PO_4$ concentraion outside the permissible range of process limitations of this invention result in unduly low overall efficiencies (below 90%) or unduly low rates of lactam production (below 350 grams per hour).

Our invention is not to be limited to the specific details of the above purely illustrative example, since many variations thereof within the scope of our invention will be obvious to those skilled in this art.

We claim:

1. In a process for depolymerizing a polymer of e-caprolactam in presence of phosphoric acid and steam to obtain e-caprolactam monomer therefrom the improvement which comprises introducing said polymer and orthophosphoric acid, in proportions averaging between about 0.1 part and about 5 parts of orthophosphoric acid calculated on 100% acid per 100 parts by weight of said polymer, substantially continuously at substantially uniform rates into a depolymerization zone containing a pool of polymer from which monomer vapor is being formed; adjusting the rates of feed to maintain the pool at substantially constant volume; maintaining the pool at temperature between 220° C. and 375° C. and at absolute pressure between about ½ and about 6 atmospheres; passing steam through said pool at a rate to provide an evolved vapor mixture containing not above about 80% by weight of e-caprolactam; and condensing evolved vapor containing e-caprolactam.

2. The process of claim 1 wherein said polymer of e-caprolactam and said phosphoric acid are introduced into said pool of polymer in the form of a solution comprising the polymer, water, orthophosphoric acid, and e-caprolactam; and wherein the orthophosphoric acid introduced is in proportions calculated on 100% acid averaging between about 0.1 part and about 1 part per 100 parts by weight of caprolactam polymer introduced, and not at any time during said continuous operation exceeding 3 parts per 100 parts of polymer introduced.

3. The process of claim 1 wherein not more than 60% of the heat supplied to the pool of polymer is supplied by direct contact with steam.

4. The process of claim 1 wherein said pool of polymer contains from about 20 parts per million to 5% of at least one metal selected from the group consisting of copper, manganese and tin.

5. The process of claim 1 wherein the steam is passed through the pool of polymer at a rate to provide an evolved vapor mixture containing between about 35% and about 80% by weight of e-caprolactam.

References Cited by the Examiner

UNITED STATES PATENTS 2,930,790  3/60  Weise _____ 260—239.3

FOREIGN PATENTS 850,437  10/60  Great Britain.
950,726  10/56  Germany.
1,112,520  8/61  Germany.

IRVING MARCUS, *Primary Examiner.*

NICHOLAS S. RIZZO, *Examiner.*